UNITED STATES PATENT OFFICE.

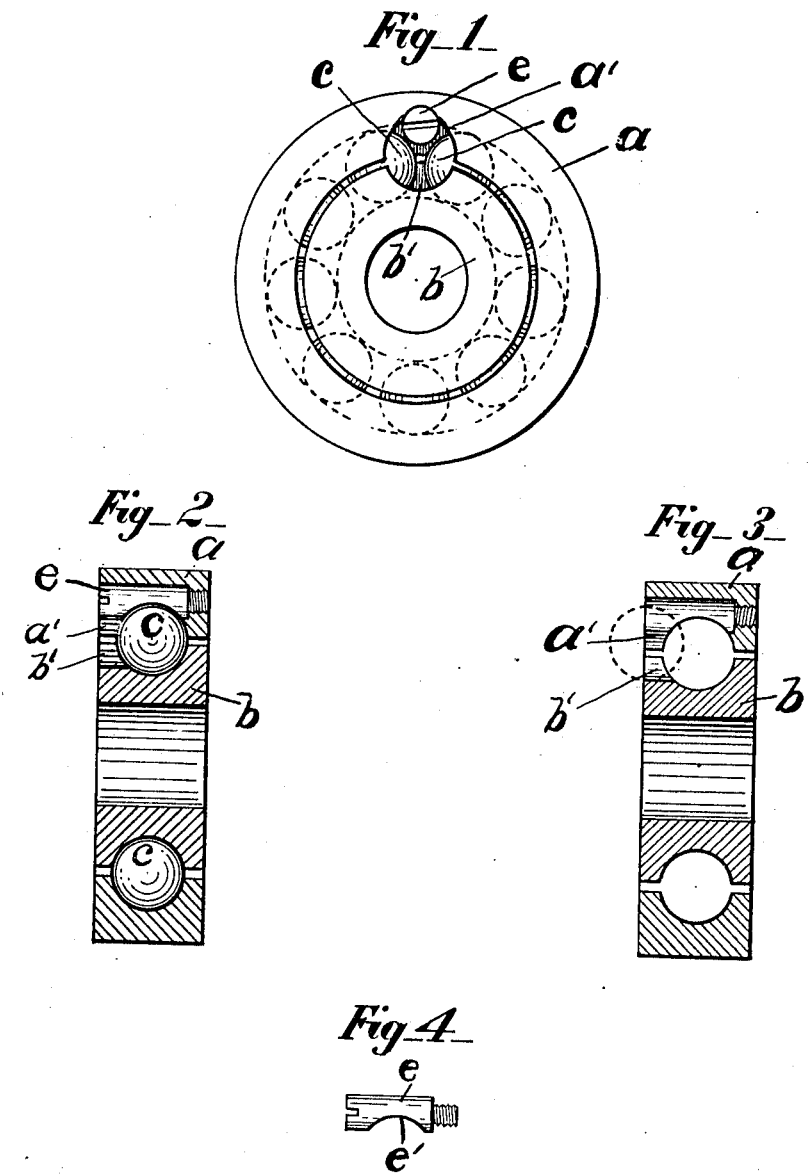

EDWIN OLDFIELD, OF NORWICH, CONNECTICUT.

BALL-BEARING.

1,035,463.  Specification of Letters Patent.  Patented Aug. 13, 1912.

Application filed October 8, 1910. Serial No. 585,915.

*To all whom it may concern:*

Be it known that I, EDWIN OLDFIELD, a citizen of the United States, residing at Norwich, in the county of New London and State of Connecticut, have invented certain new and useful Improvements in Ball-Bearings, of which the following is a specification.

The chief object of this invention is to provide simple, inexpensive and practicable means for inserting the balls in that type of ball bearings in which outer and inner rings, (having confronting grooves or raceways), are provided; my aim being to provide a practically unbroken or uninterrupted raceway for the balls when the structure is completed; the construction being such that a defective ball may be readily removed and a perfect ball substituted therefor.

My said improvement is illustrated in the accompanying drawings, Figure 1 being an end or face view of a ball bearing embodying my present invention. Figs. 2 and 3 are transverse sectional views, taken on the line 2—3 of Fig. 1 and Fig. 4 is a detached view of a screw which I employ as a partial closure for an opening through which the balls are inserted, one at a time, in the raceway.

In these drawings the letter $a$ indicates an outer ring-shaped member and $b$ a similarly shaped member located within, and concentric with, the said outer ring; said rings being formed with confronting grooves which, together, form an annular raceway for the reception of balls $c$.

The outer ring $a$ is cut away or notched at one side, as at $a'$, and the inner ring is similarly notched as at $b'$, each notch being approximately a half circle and of such size that when the two notches are brought into opposition to each other, a circular opening is provided through which a ball may be inserted or removed. As here shown, the bottom of the notch $b'$ does not extend quite to the bottom of the raceway of the inner ring, thus leaving the said raceway continuous and uninterrupted at the point which is engaged by the balls when the bearing is under a load. The notch $a'$ is partially closed, after the raceway has been filled with balls, by means of a plug $e$ that extends across the raceway, in the outer ring, the body portion of said plug being cut away, as at $e'$ to conform to and complete the otherwise interrupted continuity of the said raceway, and the plug having a screw end, engageable with a threaded opening in the ring $a$, whereby the plug is removably secured in position.

In the construction of the outer ring $a$ I prefer to seat the screw $e$ in said ring before the raceway is turned, or otherwise cut out, thus providing in the finished ring a raceway which is practically as effective and serviceable as if the ring were not cut away to receive the screw.

In the operation of assembling the several elementary parts of the ball bearing, (after the balls have been entered in the raceway) the said balls are adjusted, as seen in Fig. 1 of the drawings, so that the closure screw may be inserted between two of them and thus may be entered in its seat in the ring and screwed home and, when thus seated, the uncut portion of the screw lies below the bottom of the raceway and thus completes said raceway and prevents the escape or deflection of the balls when the ball bearing is in service.

While I have shown and described the closure screw $e$ as located in the outer ring it will be obvious that it would be equally effective, practical and convenient if located in the inner ring.

Having thus described my invention I claim as new and wish to secure by Letters Patent:—

In a ball bearing, the combination of an outer and an inner ring having confronting raceways and complemental side notches communicating with said raceways for the insertion of balls into the latter, one of said rings having a threaded aperture, and a closure plug passing through one of said notches and being provided with a screw end engaging said threaded aperture, the plug being transversely cut away intermediate of the length thereof to register with and complete said raceway.

EDWIN OLDFIELD.

Witnesses:
  FRANK H. ALLEN,
  MADELINE D. RITCHIE.